United States Patent [19]

Navar et al.

[11] Patent Number: 5,170,528

[45] Date of Patent: Dec. 15, 1992

[54] OBSTACLE CLEARING DEVICE FOR WHEELS

[76] Inventors: John J. Navar, 337 Claremore, Corpus Christi, Tex. 78412; Thomas R. Navar, 405 Rim Rd., El Paso, Tex. 79902

[21] Appl. No.: 836,802

[22] Filed: Feb. 19, 1992

[51] Int. Cl.⁵ .............................................. B60B 33/00
[52] U.S. Cl. ................................... 16/18 CG; 280/160
[58] Field of Search .................... 16/18 CG, 18 R; 280/160, 79.3; 5/510, 658

[56] References Cited

U.S. PATENT DOCUMENTS

| | | | |
|---|---|---|---|
| 2,447,582 | 8/1948 | Klumb | 16/18 CG |
| 2,450,062 | 9/1948 | Voss et al. | 16/18 CG |
| 2,830,545 | 4/1958 | Robinson et al. | 16/18 CG |
| 2,996,752 | 8/1961 | Pope | 16/18 CG |
| 3,818,542 | 6/1974 | Jones | 16/18 CG |
| 4,025,099 | 5/1977 | Virden | 16/18 CG |

FOREIGN PATENT DOCUMENTS

| | | | |
|---|---|---|---|
| 2839344 | 3/1980 | Fed. Rep. of Germany | 16/18 R |
| 633996 | 1/1983 | Switzerland | 16/18 CG |

Primary Examiner—John Sipos
Assistant Examiner—Donald M. Gurley
Attorney, Agent, or Firm—G. Turner Moller

[57] ABSTRACT

An obstacle moving device for a caster wheel is made of an electrically insulating material and is of two identical halves. The device is assembled without moving, stabilizing or disassembling the caster wheel by placing the halves on opposite sides of the caster wheel and then securing them together. A pair of roller assemblies inside the device abut the caster wheel so that rolling motion of the caster wheel pushes the device across the floor. Any obstacle encountered by the device is pushed along the path of movement of the wheel.

15 Claims, 1 Drawing Sheet

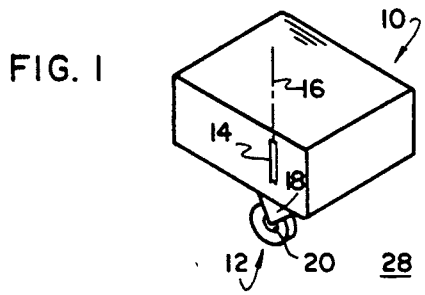
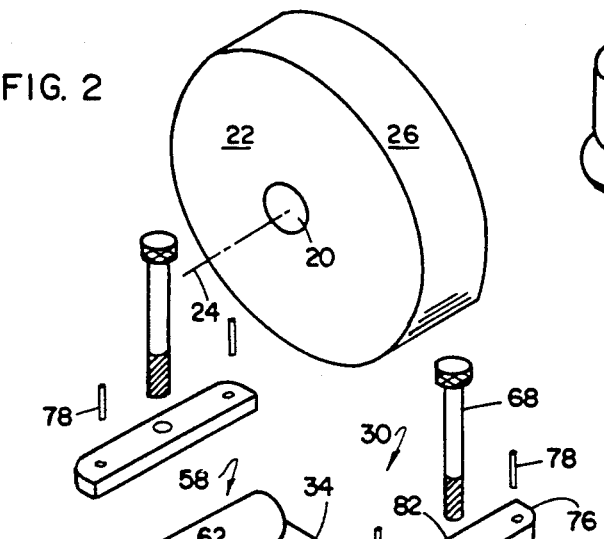
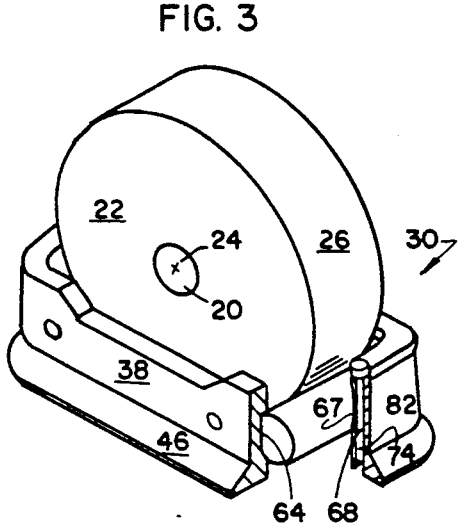
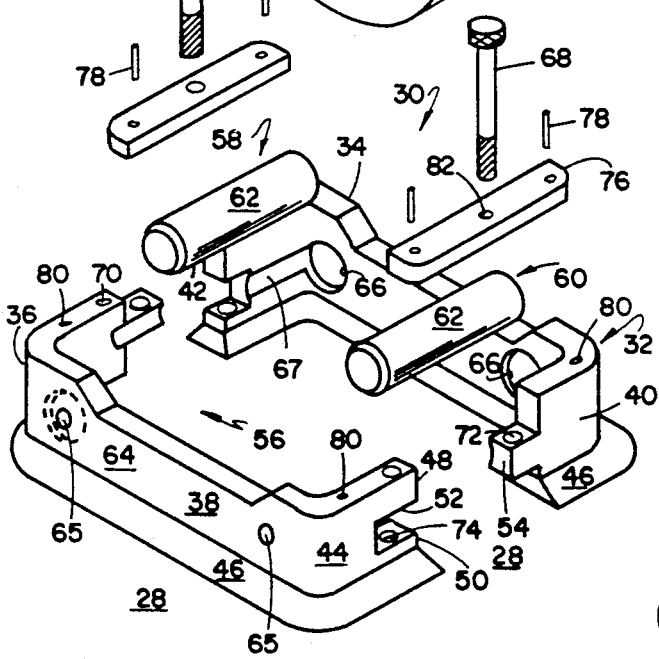
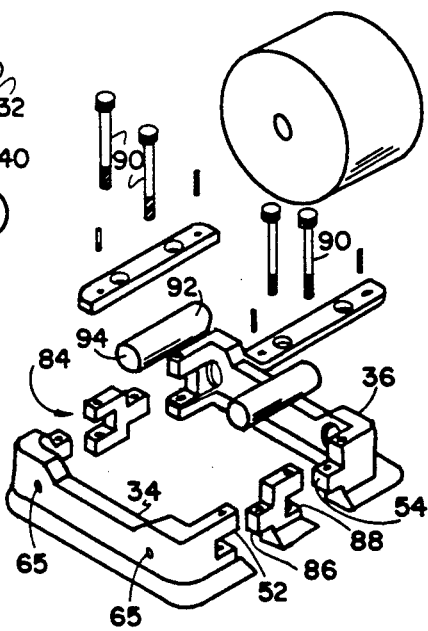

OBSTACLE CLEARING DEVICE FOR WHEELS

This invention relates to an device used in conjunction with wheels that acts to push movable obstacles away from the wheel during rolling movement of the wheel.

Anesthesia machines comprise a large cart which contains several monitoring and gas delivery devices necessary to administer an anesthetic to a patient. These machines are expensive, support delicate electronic monitoring devices and flowmeters and are usually top heavy.

The person administering the anesthetic to the surgical patient is responsible for life support functions and monitoring of the patient. The patient on the operating table is connected to the anesthesia machine with electrocardiogram leads, a gas supply hose for oxygen and anesthesia gases, a gas exhaust hose for exhalation products, and temperature and other monitoring function cables, hoses and probes.

The position of the anesthesia machine relative to the operating table varies depending on the type of surgical procedure being performed, the individual preferences of the surgical team as well as the stage of the procedure being performed. It is common to move an anesthesia machine during a surgical procedure. Most moves occur either during the initial phase of the operation or during the final phase. Thus, moves normally occur when the patient requires the closest monitoring.

Anesthesia machines move on caster wheels which share the operating room floor with other hoses, electrical power cords and electrical cables connected to various monitoring devices. Murphy's law being what it is, one rarely attempts to move an anesthesia machine except to find one or more hoses or electrical wires wedged under a caster wheel.

The person administering the anesthetic, upon encountering resistance to movement of the anesthesia machine, must either direct operating room personnel to remove the obstruction or stop monitoring the patient and remove it himself. It is tempting to simply push or pull the machine a little harder but there is an obvious if unknown limit to brute force. One cannot simply run rough shod over the obstruction because the cart is top heavy and because of the sensitive nature of the anesthetic administering devices and monitors. In addition, it is possible to roll over an oxygen hose and damage it to the extent that the hose leaks. This creates a substantial fire hazard in the operating room and can reduce oxygen and/or anesthetic delivery to the patient. Last but not least, the delays and aggravations caused by obstructions do nothing but exaggerate the already stressed and overwrought dispositions of operating room personnel.

It is not surprising that similar problems have been noted in other situations and devices proposed to move obstructions away from the wheels. Some solutions are found in U.S. Pat. Nos. 601,194; 2,450,062; 2,483,241; 2,830,545; 2,996,752; 3,184,783; 3,818,542; 3,719,370; and 4,025,099. It is this type device to which this invention most nearly relates.

There are a variety of reasons why the prior art devices are unsuitable or undesirable for use on anesthesia carts. First, the prior art devices are attached to the wheel. This may make perfect sense in the situations where the prior art devices are used, but in the case of an anesthesia machine, it is not desirable for several reasons. First, to retrofit an existing machine with a prior art device, the wheels have to be removed or disassembled to make the attachment. This requires a jack or other means to raise and/or stabilize the anesthesia machine because the machine should not be tilted when it contains liquid anesthetics, as it normally does, because the gas delivery mechanisms are prone to spill liquid contents inside their mechanisms. In this regard, the device of this invention is designed to be installed without moving or partially disassembling the anesthesia machine. Second, the prior art devices are made of metal whereas the obstruction moving device should be made of an insulating material to avoid creating a short circuit with a frayed electrical wire. Third, the obstacle clearing devices of the prior art are typically rigidly attached to the wheel or its support and accordingly are spaced a small predetermined distance from the floor. This small gap can be defeated by small electrical wires or hoses. Many operating room floors are uneven making a fixed device's distance to the floor and thus its effectiveness vary.

The obstacle moving device of this invention accordingly comprises a device which is assembled around an existing wheel but is not attached to it. Preferably, the device is of an electrically insulating material and is made of two identical parts that are connected together into a rigid component. A pair of rollable members are inside the device. As the cart moves, the wheel rolls onto one of the rollable members which slides the device across the floor in the same direction as wheel movement.

It is an object of this invention to provide an improved obstacle moving device associated with a wheel, such as a caster wheel.

Another object of this invention is to provide an improved obstacle moving device associated with a caster wheel of an anesthesia machine.

A more specific object of this invention is to provide an electrically insulating obstacle moving device for a caster wheel of an anesthesia machine which can be installed without moving or disassembling the wheel.

These and other objects of this invention will become more fully apparent as this description proceeds, reference being made to the accompanying drawing and appended claims.

IN THE DRAWINGS

FIG. 1 is a schematic view of one corner of an anesthesia machine equipped with a more-or-less conventional caster wheel;

FIG. 2 is a broken isometric view of the obstacle moving device of this invention assembled on the caster wheel of FIG. 1;

FIG. 3 is an exploded isometric view of the embodiment of FIG. 2; and

FIG. 4 is an exploded isometric view, similar to FIG. 3, of another embodiment of this invention.

Referring to FIGS. 1-3, an anesthesia cart 10 of any suitable type equipped with means (not shown) for admixing a quantity of anesthetic into an air or oxygen stream delivered to a patient, various gas flow meters (not shown) and the like. Anesthesia carts are presently sold under the names OHIO, DRAEGER and PENLON, among others.

A typical anesthesia cart 10 includes a plurality, usually four, of caster wheels 12 including an upstanding shank 14 mounted for rotation about an upstanding axis 16, a bracket 18 fixed to the shank 14 and an axle 20 supported in the bracket 18 and mounting a solid rubber tire 22 for rotation about a horizontal axis 24. The rubber tire 22 accordingly includes a cylindrical traction surface 26 rolling along an underlying surface or floor 28. Those skilled in the art will recognize the anesthesia cart 10 and the caster wheels 12 as being representative of the prior art.

Positioned around but unattached to each of the wheels 12 is an obstacle clearing device 30 of this invention. The device 30 includes a body 32 comprised of a pair of identical halves 34, 36 made of an electrically insulating material, preferably a plastic such as DELRIN or the like. The body halves 34, 36 are of generally C-shape and provide sides 38, 40 transverse to the axis 24 and ends 42, 44 transverse to the sides 38, 40. The sides 38, 40 and the ends 42, 44 cooperate to provide an inclined peripheral wall 46 extending upwardly from the floor 28. The bottom of the body 32 will be seen to slide along the floor 28. The peripheral wall 46 is accordingly an obstacle clearing member because any object on the floor 28 will be pushed out of the path of movement of the caster wheel 12 upon engagement with the wall 46.

The ends 42, 44 are of tongue and groove configuration having a pair of upper and lower projections 48, 50 and a central recess 52 receiving a central projection 54 of the adjacent end. The body halves 34, 36 accordingly provide a central space or recess 56 receiving the rubber tire 22. The top of the body 32 is substantially below the axle 20. Thus, the height of the device 30 of this invention is less than the radius of the tire 22 with which it is to be used, and preferably substantially less. Inside the space 56 are a pair of rollable members 58, 60. Desirably, the rollable members 58, 60 are far enough apart not to touch the tire surface 26 when the tire 22 is centered in the recess 56. The rollable members 58, 60 each comprise a cylindrical member 62 which is preferably a simple solid or hollow rod extruded or molded from DELRIN or other similar plastic. DELRIN is a particularly desirable material for the body 32 and members 58, 60 because of its self lubricating properties. The body halves 34, 36 provide two pairs of aligned recesses 64, 66 having an opening 65 therein for purposes more fully explained hereinafter. The recesses 64, 66 receive and mount the ends of the rod 62 for rotation relative to the traction surface 26 of the rubber tire 22. The rollable members 58, 60 accordingly engage the traction surface 26 of the rubber tire 22 and counterrotate relative to the tire 22 thereby converting rotation of the tire 22 into linear movement of the obstacle clearing member 30 along the floor 28. A small scallop 67 in the ends 42, 44 allows the members 58, 60 to roll without interference. In the alternative, the body 32 may be made slightly longer to provide the needed clearance.

The body halves 34, 36 are connected together in any suitable fashion. Conveniently, a threaded fastener 68 extends through aligned unthreaded passages 70, 72 in the projections 48, 54 into a threaded passage 74 in the lower projection 50. The fastener 68 is preferably a knurled member requiring no tools to thread and unthread. A cover plate 76 fits over the upper projection 48 and provides a pair of projections 78 fitting in a pair of spaced blind passages 80 in the ends 44. The cover plate 76 provides an unthreaded passage 82 receiving the fastener 68 and extends over a gap between the rollable members 58, 60 and the upstanding wall of the ends 42, 44 and prevents small objects from entering between the rollable members 58, 60 and the tire 22.

This minimizes objects from getting wedged between the rollable members 58, 60 and the ends 42, 44. The obstacle clearing device 30 is accordingly assembled and disassembled without needing tools. If something were to become jammed between the rollable members 58, 60 and the ends 42, 44 so the rubber tire 22 doesn't turn, the device 30 may be dismantled simply by unthreading the knurled fastener 68.

Installation and use of the obstacle clearing device 30 should now be apparent. With the caster wheel 12 on the floor 28 and without raising, stabilizing or immobilizing the cart 10, the installer places the body halves 34, 36 on opposite sides of the tire 22 and slides them, on the floor 28, toward each other. As the halves 34, 36 get close, the cylindrical rods 62 are placed in the recesses 64, 66 which are preferably deep enough to support the rods 62 in a cantilevered fashion. The body halves 34, 36 are moved toward each other until the projections 48, 50, 54 interfit and the passages 70, 72, 74 line up. The cover plate 76 is placed on top of the body 32 and the projections 78, which may be detachable as shown or integral with the bottom of the plate 76, are placed in the blind passages 80. The threaded fasteners 68 are inserted through the aligned passages 82, 70, 72, 74 and tightened. This installation technique is repeated on the remaining caster wheels 12 of the cart 10.

In use, the cart 10 is pushed or pulled along any desired path. The tire 22 is typically out of contact with one or both of the rollers 58, 60, so the tire 22 typically rolls into engagement with one of the rollers 58, 60 and then starts it counterrotating. This pushes the obstacle clearing device 30 along the path of movement of the tire 22. When the wheel 12 is castering, i.e. pivoting about the axis 16, the side of the tire 22 simply pushes against the inside of the recess 56 and thereby pivots the obstacle clearing device 30 about the axis 16. When the obstacle clearing member 46 contacts a hose, electrical power cord, wire, or similar obstruction, the obstruction is pushed in the path of movement of the device 30 and may ride up the incline of the obstacle clearing member 46. If there is any tendency of the device 30 to tip, the end away from the direction of movement tends to rise off the floor 28 so the trailing roller 58, 60 (out of engagement with the tire 22) rises into contact with the trailing edge of the tire 22 thereby preventing the device 30 from tipping further.

As illustrated in FIGS. 1-3, the device 30 is designed to receive tires of a given thickness. There are a few anesthesia carts that provide double wheels or larger than normal tires. To accommodate this possibility, an expansion joint 84 shown in FIG. 4 is provided. The expansion joint 84 includes one end 86 sized and shaped to fit in the recess 52 and a second end 88 sized and shaped to receive the projection 54 and thereby increase the width of the obstacle clearing device 30. The expansion joint 84 accordingly includes threaded fasteners 90 to connect the body halves 34, 36 and the cover plate 76. Thus, a wider obstacle clearing device is provided simply by use of a pair of the expansion joints 84 and rollers 62 and cover plates 76 of somewhat greater length.

Two features of FIG. 4 should now be apparent. First, the expansion joints 84 are identical which means that only one injection mold or cavity has to be made. Second, it will be found that assembly is complicated when the body halves 34, 36 are advanced toward each other from opposite sides of the tire 22. When the rollers 92 are inserted into one of the recesses, they are so long they will probably not be cantilevered into alignment with the recesses on the opposite body half. To overcome this difficulty, the rollers 92 are preferably hollow rods having a central opening 94 aligned with the openings 65. A probe may be inserted through the openings 65 to guide the rollers 92 into alignment with the other recess as the body halves 34, 36 are moved toward each other during assembly.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

We claim:

1. In combination, a wheel having a rolling surface, a shaft rotatably supporting the wheel on a device to be rollably supported on a floor surface at least partially by the wheel, and obstacle clearing means for moving along the floor in advance of the wheel during rolling movement thereof and pushing objects away from the rolling path of the wheel, the obstacle clearing means comprising an obstacle clearing member supported on the floor and having a recess receiving the wheel therein, and means in the recess for abutting the rolling surface of the wheel and converting rolling movement of the wheel into sliding movement of the obstacle clearing member.

2. The combination of claim 1 wherein the means in the recess comprises a first roller adjacent a forward end of the wheel and a second roller adjacent a rearward end of the wheel, the first and second rollers being mounted for rotation about spaced axes.

3. The combination of claim 2 wherein the rollers have generally cylindrical rolling surfaces, the first and second rollers being mounted for rotation about spaced parallel axes.

4. The combination of claim 1 wherein the obstacle clearing member is capable of limited horizontal movement relative to the wheel parallel to the rolling path of the wheel.

5. The combination of claim 1 wherein the obstacle clearing member is of electrically insulating material.

6. The combination of claim 1 wherein the obstacle clearing member is slidably supported on the floor.

7. The combination of claim 1 wherein the wheel is a caster wheel having means for pivotally mounting the wheel for rotation about a vertical axis perpendicular to the shaft.

8. In combination, a wheel having a rolling surface, a shaft supporting the wheel for rotation about an axis on a device to be rollably supported on a floor surface at least partially by the wheel, and obstacle clearing means for moving along the floor in advance of the wheel during rolling movement thereof and pushing objects away from the rolling path of the wheel, the obstacle clearing means comprising an obstacle clearing member supported on the floor and being unattached and unsupported by the wheel and comprising first and second generally C-shaped sections providing a recess having the wheel therein, the first and second sections having sides transverse to the axis on opposite sides of the wheel and ends transverse to the sides and means releasably connecting the sections together.

9. The combination of claim 8 wherein the first and second sections are identical.

10. The combination of claim 8 wherein the first and second sections are of electrically insulating material.

11. The combination of claim 8 wherein the obstacle clearing member is capable of limited horizontal movement relative to the wheel parallel to the rolling path of the wheel.

12. The combination of claim 8 further comprising means in the recess for abutting the rolling surface of the wheel and converting rolling movement of the wheel into sliding movement of the obstacle clearing member.

13. The combination of claim 12 wherein the section ends provide interdigitating projections and means connecting the projections together.

14. The combination of claim 13 wherein the means abutting the rolling surface of the wheel and converting rolling movement of the wheel into sliding movement of the obstacle clearing member comprises a pair of cylindrical members having ends and the section sides provide aligned recesses receiving the cylindrical member ends.

15. The combination of claim 8 wherein the wheel is a caster wheel having means for pivotally mounting the wheel for rotation about a vertical axis perpendicular to the shaft.

* * * * *

REEXAMINATION CERTIFICATE (4338th)

United States Patent
Navar et al.

(10) Number: US 5,170,528 C1
(45) Certificate Issued: May 8, 2001

(54) OBSTACLE CLEARING DEVICE FOR WHEELS

(75) Inventors: John J. Navar, Corpus Christi; Thomas R. Navar, El Paso, both of TX (US)

(73) Assignee: Movit, Inc., Corpus Christi, TX (US)

Reexamination Request:
No. 90/004,866, Dec. 12, 1997

Reexamination Certificate for:
Patent No.: 5,170,528
Issued: Dec. 15, 1992
Appl. No.: 07/836,802
Filed: Feb. 19, 1992

(51) Int. Cl.⁷ .................................................... B60B 33/00
(52) U.S. Cl. .................................... 16/18 CG; 280/160
(58) Field of Search ................................ 16/18 R, 18 CG, 16/41; 280/79.3, 160; 5/510, 658; 104/279, 280; 312/351.11, 351.12, 351.13

(56) References Cited

U.S. PATENT DOCUMENTS

| | | | |
|---|---|---|---|
| 601,194 | * | 3/1898 | Zimmerman .............................. 83/478 |
| 834,529 | * | 10/1906 | Madison .................................. 104/279 |
| 986,136 | * | 3/1911 | Carberry et al. ........................ 104/279 |
| 1,204,236 | * | 11/1916 | Begg ....................................... 104/279 |
| 1,274,657 | * | 8/1918 | Zorn ........................................ 104/279 |
| 2,450,062 | | 9/1948 | Voss et al. ................................. 16/18 |
| 2,483,241 | | 9/1949 | Shepherd ................................... 16/18 |
| 2,753,491 | * | 7/1956 | Legge ..................................... 16/18 R |
| 2,830,545 | | 4/1958 | Robinson et al. ....................... 105/170 |
| 2,830,825 | * | 4/1958 | Webber et al. ......................... 16/18 R |
| 2,996,752 | | 8/1961 | Pope .......................................... 16/18 |
| 3,184,783 | | 5/1965 | Brigham ................................... 16/18 |
| 3,719,370 | | 3/1973 | Gintick et al. ....................... 280/33.99 |
| 3,726,535 | * | 4/1973 | Longato ................................ 16/18 R |
| 3,818,542 | | 6/1974 | Jones ........................................ 16/18 |
| 4,025,099 | | 5/1977 | Virden ..................................... 293/58 |

FOREIGN PATENT DOCUMENTS

566371 * 2/1924 (FR) .................................. 16/18 CG

\* cited by examiner

*Primary Examiner*—Anthony Knight

(57) ABSTRACT

An obstacle moving device for a caster wheel is made of an electrically insulating material and is of two identical halves. The device is assembled without moving, stabilizing or disassembling the caster wheel by placing the halves on opposite sides of the caster wheel and then securing them together. A pair of roller assemblies inside the device abut the caster wheel so that rolling motion of the caster wheel pushes the device across the floor. Any obstacle encountered by the device is pushed along the path of movement of the wheel.

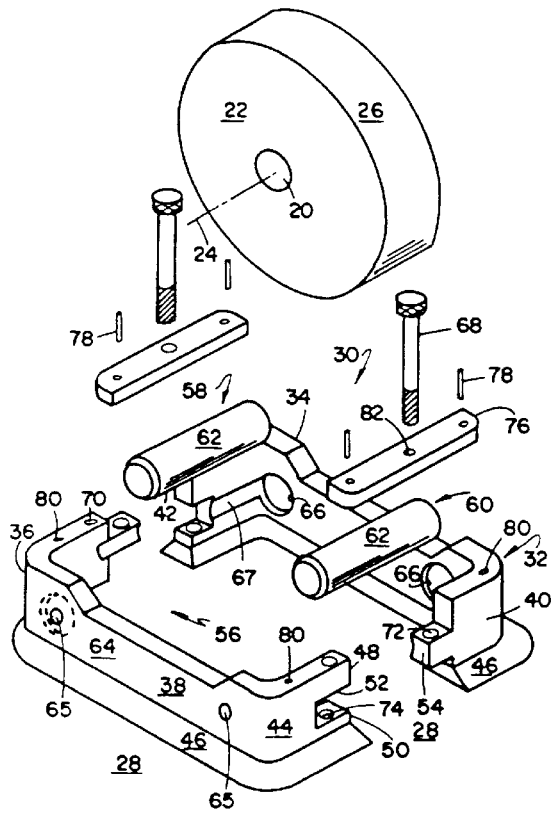

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4–7, 9, 12, 13 and 15 are cancelled.

Claims 3, 8, 11 and 14 are determined to be patentable as amended.

Claim 10, dependent on an amended claim, is determined to be patentable.

3. The combination of claim [2] *8* wherein the rollers have generally cylindrical rolling surfaces, the first and second rollers being mounted for rotation about spaced parallel axes.

8. In combination, a *castor* wheel *for use on medical equipment, the wheel* having a rolling surface, a shaft supporting the wheel for rotation about an axis on a device to be rollably supported on a floor surface at least partially by the wheel, and obstacle clearing means for moving along the floor in advance of the wheel during rolling movement thereof and pushing objects away from the rolling path of the wheel, the [obstacle clearing means] *combination* comprising:

[an] *said* obstacle clearing [member] *means* supported on the floor and being unattached and unsupported by the wheel and comprising first and second generally C-shaped sections providing a recess having the wheel therein, the first and second sections having sides *with a top and bottom end, the ends of the C-shaped sections include interdigitating projections, the first and second sections having sides* transverse to the axis on opposite sides of the wheel and ends transverse to the sides and means releasably connecting the sections together[.];

*means engaging the wheel in the recess for abutting the rolling surface of the wheel and converting rolling movement of the wheel into sliding movement of the obstacle clearing means;*

*inclined peripheral wall means extending upwardly from the bottom end of the sides of the C-shaped sections; and*

*fastener means for releasably interconnecting the interdigitating projections of the C-shaped sections.*

11. The combination of claim 8 wherein the obstacle clearing [member] *means* is capable of limited horizontal movement relative to the wheel parallel to the rolling path of the wheel.

14. The combination of claim [13] *8* wherein the means *engaging the wheel* abutting the rolling surface of the wheel and converting rolling movement of the wheel into sliding movement of the obstacle clearing [member] *means* comprises a pair of cylindrical members having ends and the [section sides] *side walls* provide aligned recesses receiving the cylindrical member ends.

* * * * *